United States Patent [19]
Jones

[11] 3,769,093
[45] Oct. 30, 1973

[54] VACUUM LOADING PROCESS FOR THE MANUFACTURE OF A NARROW PORE FLUID ELECTRODE
[75] Inventor: Paul W. Jones, Gainesville, Fla.
[73] Assignee: General Electric Company, Owensboro, Ky.
[22] Filed: Aug. 21, 1970
[21] Appl. No.: 66,020

Related U.S. Application Data
[62] Division of Ser. No. 691,314, Dec. 18, 1967, abandoned.

[52] U.S. Cl. .......................................... 136/120 FC
[51] Int. Cl. .......................................... H01m 13/04
[58] Field of Search .................... 136/120 FC, 86 D; 264/87

[56] References Cited
UNITED STATES PATENTS

| | | | |
|---|---|---|---|
| 3,097,974 | 7/1963 | McEvoy | 136/120 FC |
| 3,235,473 | 2/1966 | Le Duc | 136/120 FC |
| 3,276,975 | 10/1966 | Holechek | 264/87 X |
| 3,549,423 | 12/1970 | Grubb et al. | 136/120 FC |
| 3,125,468 | 3/1964 | Thompson et al. | 136/120 FC |
| 3,097,116 | 7/1963 | Moos | 136/120 FC |
| 3,226,263 | 12/1965 | Oswin | 136/120 FC |

*Primary Examiner*—Winston A. Douglas
*Assistant Examiner*—M. J. Andrews
*Attorney*—Nathan J. Cornfeld, Frank L. Neuhauser, Oscar B. Waddell, John P. Taylor and Joseph B. Forman

[57] ABSTRACT

An electrode suitable for use as a fluid electrode in a fuel cell or a metal-air cell, for example, is provided comprised of an electronically conductive carrier having narrow pores extending through its thickness. The pores have an average diameter less than one-tenth the thickness of the carrier. In a preferred form the carrier is a sintered plaque. An electrocatalyst lies in the pores in intimate contact with the carrier and a hydrophobic material lies in the pores and overlies the electrocatalyst. The hydrophobic material is uniformly distributed in the pores.

In another aspect my invention is directed to process of manufacturing a hydrophobic fluid electrode. A finely divided particulate electrocatalytically active material is dispersed in water and delivered to one face of a carrier while a vacuum is drawn adjacent the opposite face. The aqueous dispersion is passed through until the desired level of electrocatalyst loading is achieved, and the loaded carrier is then impregnated with hydrophobic agent. The hydrophobic agent is cured by heating to complete formation of the electrode. In a preferred technique the aqueous dispersion is continuously recirculated through the carrier to make maximum utilization of the dispersed electrocatalyst. Preferably the carrier is compressed after loading but before wetproofing.

8 Claims, 2 Drawing Figures

United States Patent [19]
Jones
[11] 3,769,093
[45] Oct. 30, 1973
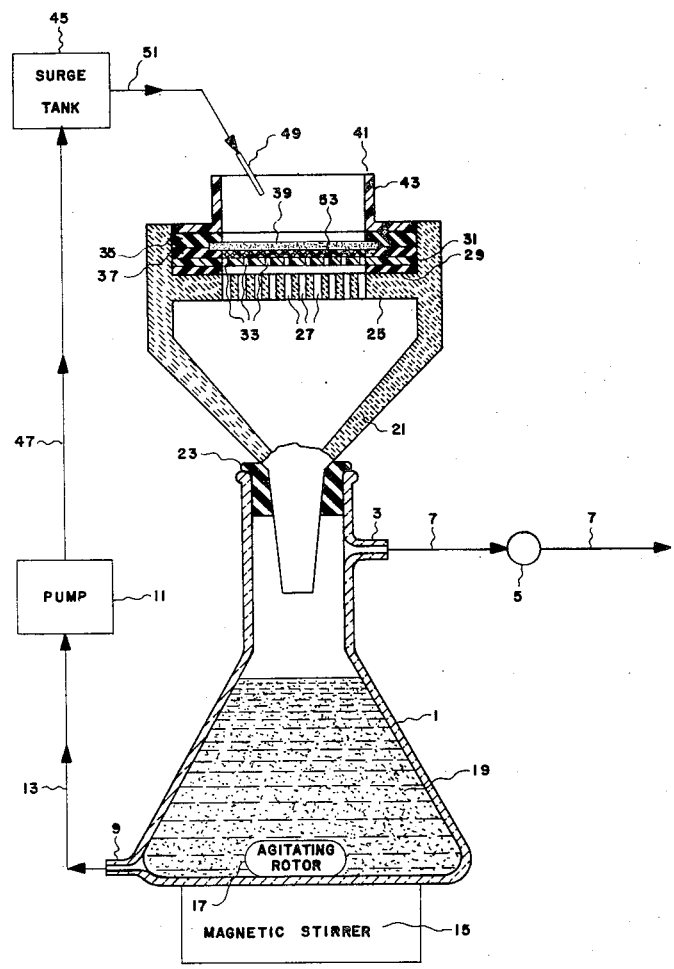

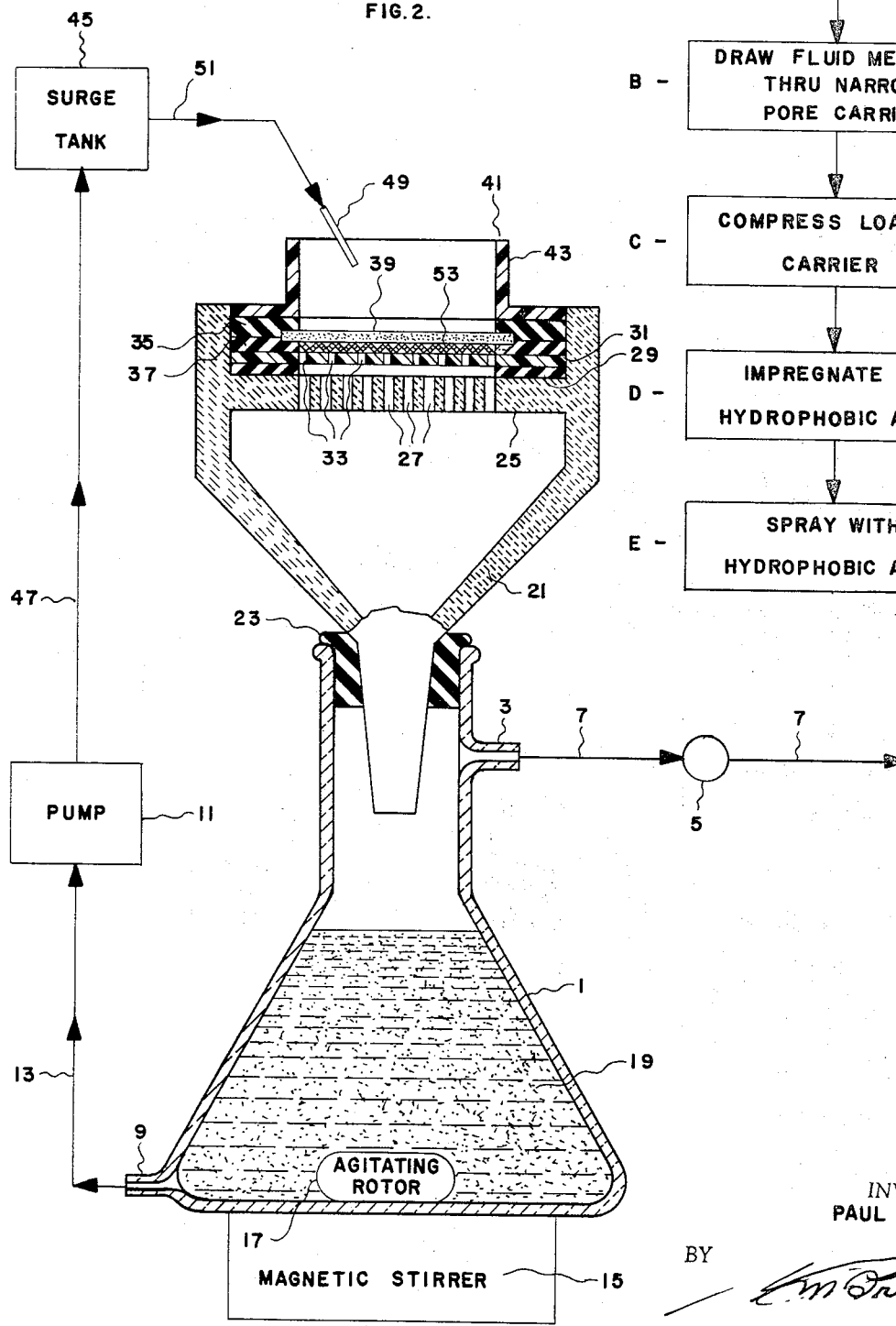
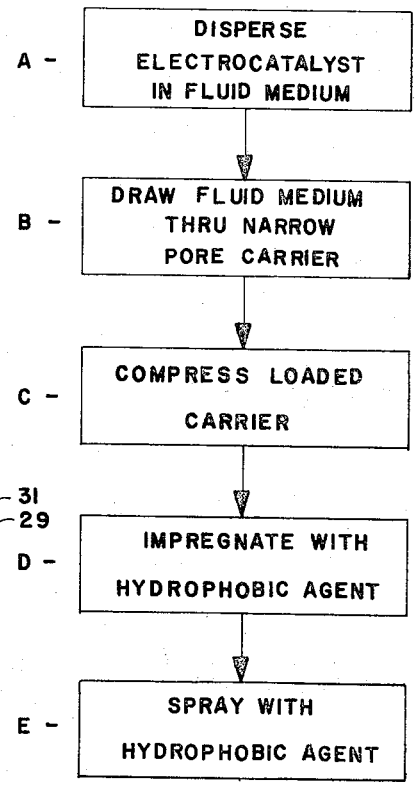

VACUUM LOADING PROCESS FOR THE MANUFACTURE OF A NARROW PORE FLUID ELECTRODE

This application is a division of applicant's copending Application Ser. No. 691,314 now abandoned, filed Dec. 18, 1967, and assigned to the same assignee as the present invention.

My invention relates to a novel fluid electrode and to a process for its manufacture.

If a strip of platinum is mounted at the interface of a reducible fluid and a liquid electrolyte it can be made to function as a fluid electrode by providing an electron flow path from the electrode to a counter electrode lying in contact with the electrolyte. The platinum strip acts as a fluid electrode in being capable of catalyzing chemical reaction of the reducible fluid so that it transfers electrons to the fluid without itself being chemically altered and, also, in being electronically conductive and thereby receiving a corresponding number of electrons from the counter electrode through the electron flow path. A platinum strip also functions as a fluid electrode in contact with an oxidizable fluid, although the direction of current is reversed. If one fluid electrode is contacted with an oxidizable fluid while a second fluid electrode in ionic communication therewith is contacted with a reducible fluid, the essential elements of a fuel cell are met. If, on the other hand, the counter electrode for a fluid electrode is a conventional primary or secondary electrode which is chemically altered on discharge, a hybrid type of cell is produced which partakes of some of the characteristics of a fuel cell and some of the characteristics of a conventional primary or secondary cell.

While a platinum strip is capable of functioning as a fluid electrode, in view of the necessity of achieving a high surface area per unit weight of material in order to lower the amount of previous electrocatalysts, such as platinum metals, required and to increase the maximum power densities obtainable, the widespread use of electrocatalysts in finely particulate form has been adopted. A penalty associated with finely dividing an electrocatalyst material (or a separate electronically conductive material blended therewith where the electrocatalyst is not itself of low electronic conductivity) is an increase in the internal resistance of the fluid electrode structure. Accordingly, most common fluid electrode structures incorporating a finely divided electrocatalyst also incorporate a highly electronically conductive component, referred to as a current collector or carrier, for the express purpose of improving the transport of electrons between the reaction sites on the electrocatalyst surface and the external electrical circuit. The efficiency of the current collector in reducing the internal resistance of an electrode structure is directly related to the intimacy of the electronically conductive association with the particular electrocatalyst. This has led to the widespread use of foraminous current collectors, such as screens, expanded metal, foamed metal, and carbon plaques. The intimate association between the current collector strands and the active composition produces a better electronic coupling than could be achieved by spreading the same composition on the surface of an electronically conductive carrier.

It may be readily recognized that the desirability of utilizing a finely particulate active mass in order to achieve an intimate association with a current collector extends not only to fluid electrode structures, but to many conventional primary and secondary electrodes as well. An added difficulty peculiar to fluid electrodes is that the active composition must remain readily penetrable by fluid reactant so that the reactant can gain access to the reaction sites distributed throughout the electrode structure. Where the active composition of a fluid electrode is formed entirely of electrocatalyst particles, the reactant may be prevented from penetrating the active composition by the electrolyte selectively filling the intersticial pores through capillary action. Also, the fluid reactant frequently interacts with the electrolyte at the electrocatalyst reaction sites to produce water, which may collect and provide a barrier to the further introduction of fluid reactant.

Very efficient fluid electrode structures have been developed which avoid the difficulty of excessive wetting be electrolyte and/or reaction products and resultant blocking of electrocatalyst reaction sites. These electrode structures incorporate a hydrophobic agent, such as a hydrophobic polymer—usually a fluorocarbon polymer. According to one commonly used forming technique the electrochemically active composition is spread into the relatively large, straight-through pores of a current collector in the form of an aqueous slurry of a hydrophobic polymer and an electrocatalyst and then sintered, usually accompanied by pressing. According to a variant technique the hydrophobic polymer and the electrocatalyst are admixed as a dry powder before introduction into the current collector openings.

Fluid electrodes utilizing finely particulate electrocatalysts intimately associated with a hydrophobic agent and spread into the openings of a foraminous current collector have found wide application of the art. I have noted, however, that this fluid electrode approach as conventionally practiced requires the use of current collectors having relatively large, straight-through openings.

It is obvious from a theoretical viewpoint that for any given electrocatalytically active composition the electrode construction which exhibits the least mean distance for electronic conduction between electrocatalyst reaction sites and the current collector will exhibit the least internal resistance. In practical terms this would suggest that the more widely distributed the carrier within the electrode construction—i.e., the larger the number of openings and the smaller their mean diameter—the better would be the conductivity of the electrode structure.

no technique has been known to the art prior to my invention of obtaining a fluid electrode structure in which an active composition including a wet-proofing agent thoroughly penetrates th pores of a current collector having openings that are relatively small as compared to their length. Merely spreading an electrocatalytically active composition onto the surface of such a current collector is ineffective to achieve more than a superficial penetration of the carrier. Attempts to press the composition into the pores have been generally unsuccessful, since, except for slight surface penetration, the active composition tends to compact as a surface layer on the carrier. Accordingly, prior to my invention, it has not been possible to construct a fluid electrode structure exhibiting both uniform hydrophobic properties and minimal internal resistances.

It is an object of my invention to provide a novel fluid electrode and a process for its manufacture in which a particulate electrocatalytically active material and a hydrophobic material intimately permeate a narrow-pore carrier to produce an efficiently wet-proofed fluid electrode structure of low internal resistance.

In one aspect my invention is directed to a fluid electrode intended to be positioned with one major face in contact with a fluid reactant and a second, opposed major face in contact with an electrolyte. The fluid electrode incorporates an electronically conductive carrier having a plurality of openings extending through the thickness thereof, the thickness of the carrier being at least 10 times the average opening diameter. An electrocatalytically active material permeates the carrier an intimate electronically conductive relation therewith and is distributed throughout the thickness of the carrier. A hydrophobic material lies within the openings of the carrier.

In another aspect my invention is directed to a process of manufacturing a hydrophobic fluid electrode structure. A finely divided particulate electrocatalytically active material is dispersed in a fluid medium. The fluid medium is delivered with the material dispersed to one major face of an electronically conductive carrier having a plurality of openings with an average diameter less than one-tenth of the thickness of the carrier. The openings extend between first and second major surfaces the carrier. The ambient pressure adjacent the second opposed major face is reduced with respect to the pressure adjacent the first major face, and the fluid medium is allowed to circulate through the carrier until the desired loading of the electrocatalytically active material has collected in the openings of the carrier. The carrier is impregnated with a hydrophobic agent in a liquid dispersant and is heated to drive off the liquid dispersant and to impart hydrophobicity to the carrier openings.

My invention may be better understood by reference to the following detailed description considered in conjunction with the drawings, in which:

FIG. 1 is a schematic diagram of a preferred embodiment of my fluid electrode forming process, and FIG. 2 is a vertical section with parts schematically shown of an apparatus for performing the step of loading the carrier with particles.

FIG. 1 diagrammatically illusrates a preferred process for the formation of my novel fluid electrodes. Step A of the process consists of mixing a finely divided electrocatalyst with a fluid medium which acts as a dispersant. Any conventional electrocatalytically active material or composition may be utilized, so long as it can be placed in finely divided particulate form. If any of the platinum metals, nickel, silver, or gold are utilized as electrocatalysts, for example, they may be utilized alone, as alloys, or as mixtures in the form of blacks, such as platinum black, palladium black, Raney nickel, carbon black, etc., or in any other finely divided form. Also, it is anticipated that the particules utilized may be composite particles of electrocatalyst supported on a substrate, such as carbon, boron carbide (disclosed by Grubb in commonly assigned patent application Ser. No. 492,226, now abandoned filed Oct. 1, 1965, and incorporated by reference), titanium oxide, etc. For certain applications it may be desirable to incorporate still other materials. For example, where substantial concentrations of carbon monoxide contaminate the reactant to be supplied to the fluid electrode structure, it may be desirable to incorporate electrocatalyst adjuvant, such as tungsten or molybdenum oxides (disclosed by Niedrach in commonly assigned patent application Ser. No. 492,201, filed Oct. 1, 1966, now U.S. Pat. No. 3,393,100 and incorporated by reference).

Any liquid or gaseous dispersant which is inert toward the finely divided electrocatalytically active material may be utilized. It is preferred to use a liquid dispersant, since less agitation is required in order to maintain particulate material in dispersion in liquids. From an economic viewpoint water is a preferred dispersant, although it is recognized that organic fluids inert toward the catalyst and carrier materials may also be utilized. It is contemplated viscosity increasing additives may be utilized in conjunction with the dispersants, if desired.

Where a liquid dispersant such as water is utilized, it is preferred to preliminarily agitate the particulate elecctrocatalytically active material with the dispersant to form a relatively concentrated dispersion. The time and intensity of the agitation is adjusted to achieve the desired degree of comminution and dispersion of the particles. The dispersion may then be blended with additional liquid to reach the desired concentration of particulate material. It is usually preferred to continue agitation of the dispersion after it is formed, but with very finely divided particles the tendency toward settling may be extremely slow. For example, although electrocatalytically active material is referred to as particulate, it is appreciated that colloidally divided material may be dispersed if desired. It is usually preferred to attempt utilization of particles having a mean diameter of less than 0.1 micron in order to avoid the necessity of expending excessive amounts of energy in agitation and since particles above this size do not make maximum utilization of the electrocatalytically active materials.

The second step of my process calls for drawing through a narrow-pore carrier the fluid medium with the electrocatalytically active material dispersed therein. This is shown as step B in the FIG. 1 diagram. This step is best appreciated with reference to a specific apparatus for its practice shown in FIG. 2. As shown, a flask 1 is fitted with an upper side arm 3 connected to a vacuum pump 5 to produce displacement of air or vapors as schematically indicated by flow arrows 7. A lower side arm 9 is connected to a peristaltic or other type pump 11 as schematically indicated by flow arrows 13. The flask sits on a magnetic stirrer 15 having a stirring rotor 17 within the flask. The fluid dispersion 19 is initially contained within the flask.

A funnel 21 is sealingly fitted into the neck of the flask by means of a stopper 23. The funnel is provided with an integral bridge 25 spaced from its upper edge containing a plurality of perforations 27. An annular gasket 29 is supported by the bridge and peripherally surrounds the perforations therein. A lower mounting frame 31 overlies the gasket 29 and is centrally provided with a pluraliy of openings 33. Upper and lower resilient clamping gaskets 35 and 37 are supported by the lower mounting frame. The narrow-pore carrier 39 is sized with respect to the clamping gaskets so that its periphery is sandwiched between the upper and lower clamping gaskets adjacent their interior edge. The central portion of the carrier is supported by a corrugated perforate sheet 53 positioned over the mounting frame.

The upper and lower clamping gaskets lie in sealing engagement adjacent their exterior edge. An upper frame 41 provided with an upstanding liquid retainer 43 is supported by the upper clamping gasket. The upper frame and the lower mounting frame are preferably interconnected by a plurality of peripherally distributed bolts, not shown, so as to compress the clamping gaskets into sealing engagement about the periphery of the carrier.

The fluid dispersion is pumped by the peristaltic pump to a surge tank 45 as indicated schematically by flow arrows 47. The fluid dispersion is pumped from the surge tank to an upper surface of the carrier through a delivery hose 49 shown schematically connected to the surge tank by means of flow arrows 51. The lower end of the delivery hose normally lies above the upper surface of the carrier and may be manually moved back and forth as desired to yield a uniform electrocatalyst loading.

The narrow-pore carrier 39 is so designated since it is selected so that the through pores have an average mean diameter less than one-tenth, preferably less than 1/25, of the thickness thereof. As is well understood by those skilled in the art, the carrier must be formed of an electronically conductive material which is chemically inert within the cell environment in which the electrode incorporating the carrier is to be used. The carrier is preferably of sufficient thickness that it may be relied upon to form the structural skeleton of the fluid electrode in which it is incorporated. The porosity of the carrier may range from 25 to 90 percent, with a porosity of from 50 to 80 percent being preferred for most carrier constructions. A preferred carrier is formed by flattening an expanded metal screen and covering it with metal particles and water in a one to one volume ratio, where the mixture is thickened with approximately 1 percent sodium carboxymethylcellulose or any equivalent thickening agent. The screen so covered is first dried and then sintered to join the metal particles to the expanded metal screen and to each other. The resultant carrier is provided with relatively narrow pores. While it is appreciated that the exact pore size will vary as a functionn of the forming technique employed and the size of metal particles chosen for incorporation, I have found that preferred carriers are those having pore sizes in the range from 1 to 15 microns in mean diameter formed according to the above technique. An optimum range of pore sizes where the electrocatalyst is in the form of a black is from 3 to 6 microns in mean diameter. The carrier should have a thickness at least 10 times the mean pore diameter. Carrier thicknesses of at least 25 times the mean pore diameter are preferred, and carrier thicknesses of at least 40 times are most preferred. While carriers of any thickness having through pores may be utilized in the practice of my invention, generally there is no advantage in using carriers having thicknesses in excess of about a quarter of an inch. As additional specific illustrations of carriers that may be utilized in the practice of my invention, carbon plaques may be used. Consolidated particles and/or fibers may be utilized to form a carrier, if desired. If carrier pores are initially too large, the carrier (unless brittle) may be compressed to produce desirably narrow pores. Where the diameter of pore openings is large as compared to the thickness of a given material, a suitable carrier may be formed by laminating together multiple layers of the material. For example, a suitable carrier may be formed by laminating a plurality of layers of screen. It is also anticipated that carriers may be formed of multiple layers of dissimilar materials. For example, a suitable composite carrier may be formed by compacting a finely divided powder between two layers of screen. It is not necessary that the material comprising each carrier layer be electronically conductive, although all layers should be resistant to chemical attack in the environment of use.

To load the carrier with electrocatalytically active material it may be mounted as illustrated in FIG. 2. The liquid dispersion 19 containing the finely divided electrocatalytically active material is agitated by the rotor 17 of the magnetic stirrer 15 so that any tendency of the particles to settle is offset. The liquid dispersion is pumped from the flask 1 to the upper surface of the carrier 39 by the peristaltic pump 11 through side arm 9, surge tank 45, and delivery hose 49.

The delivery hose is moved back and forth above the upper surface of the carrier so that the liquid dispersion contacts all portions of the carrier surface in approximately like amount. The liquid retainer 43 prevents any of the liquid dispersion from being lost. I have discovered that if the liquid dispersion is merely applied to the surface of the carrier and allowed to filter through under the influence of gravity there is a tendency for the particles to form a surface coating on the carrier rather than to penetrate the pores and be deposited predominately therein. I have also discovered that supplying liquid through the delivery hose at a rate in excess of the rate of transport through the carrier so that a liquid head is built up also tends to produce a surface deposit of particles rather than a complete penetration of the carrier pores.

Accordingly, it is preferred to reduce the pressure within the flask and funnel 21 by connecting a vacuum pump 5 to the upper side arm 3. If a pressure in the range of from nine-tenths to half of atmospheric pressure is maintained adjacent the lower surface of the carrier while the rate of delivery of liquid dispersant is controlled so that it enters the pores of the carrier immediately upon contact, the particles dispersed in the liquid will be almost entirely deposited within the pores of the carrier and the tendency toward formation of a surface layer of particles will be obviated. Since liquid preferably does not stand over the entire surface of the carrier, substantial quantities of air will be drawn through the carrier as the liquid dispersion is circulated. It is believed that the air being drawn through the carrier helps to draw the particles into the pores of the carrier.

In most instances all of the electrocatalytically active particles will not lodge within the carrier pores during a single pass through the carrier. It is possible that the remaining particles may be removed by other conventional separation techniques. I have found it advantageous to continuously recirculate the liquid dispersion until the desired particle loading is reached. Thus, the steps of loading the carrier and reclaiming residual electrocatalyst may be to some extent combined, although it is considered that some electrocatalyst will always remain in the liquid dispersion. Since the particles dispersed in the liquid impart a distinctive color, it is my recognition that the loading of particles in the carrier may be quantitatively controlled with considerable ease and accuracy by monitoring the opacity of the liquid dispersion.

After the carrier has been loaded with electrocatalyst particles, it is preferred to compress the carrier as indicated by step C in FIG. 1. One purpose of compressing the carrier is to lock the electrocatalyst within the pores. Inasmuch as the particles are initially distributed throughout the carrier it is not essential that the carrier be compressed in order to hold the bulk of the particles in place in most applications. In cell applications where a substantial pressure differential exists across the fluid electrode structure or where substantial amounts of reaction product are formed in the electrode pores, compression of the carrier constitutes one approach of insuring against electrocatalyst erosion. Compression of the loaded carrier is also desirable in order to substantially reduce the fluid permeability of the electrode structure. Whereas fluid is drawn through the carrier in order to achieve a loading distributed throughout the cross-sectional thickness thereof, fluid electrode structures are frequently mounted at the interface of a fluid reactant and relied upon to dam the electrolyte and prevent its draining or seeping into the reactant chamber. It is preferred to rely upon a combination of compaction and wet-proofing, as described below, to produce an electrode structure capable of physically damming a free liquid electrolyte. In cell applications where an immobilized electrolyte is employed, such an aqueous electrolyte held in a capillary matrix or an ion exchange structure, or where a flow-through type of fluid electrode is desired, it is appreciated that damming of electrolyte is not a factor and it may be desirable to completely eliminate the step of compression. A significant process advantage of compression following loading is that higher circulation rates of fluid dispersing medium may be utilized and hence loading times reduced.

Where the fluid electrode structure is to be mounted in a cell so that it dams a free liquid electrolyte or is to be used so that water forms as a reaction product in the pores, it is preferred to impart a degree of hydrophobicity of the pores of the electrode structure. A wide variety of wet-proofing agents and techniques are known to the art and may be utilized. I prefer to utilize a linear hydrophobic organic polymer which is liquid dispersed. Preferred polymers are those having a critical surface tension lower than the surface tension of water and most preferred polymers are those having a critical surface tension less than 32 dynes/cm. Critical surface tension is defined as the value of the liquid surface tension at which liquids spread on a given polymer surface. A full discussion of critical surface tension is provided at page 240, "Surface Chemistry Theory and Industrial Application" by Lloyd I. Osipow, Reinhold Publishing Corporation, New York, 1962. Linear halocarbon polymers, particularly linear fluorocarbon polymers, exhibit low critical surface tensions and are generally preferred. Excellent wet-proofing polymers include polytetrafluoroethylene, polyhexafluoropropylene, polyvinylidene fluoride, polychlorotrifluoroethylene, and copolymer variations thereof.

For the practice of my process the hydrophobic agent is dispersed in a liquid medium. Any liquid medium which does not chemically react with the polymer and which can be evaporated at a temperature below the sintering temperature of the hydrophobic agent may be employed. If the liquid medium is incapable of wetting the hydrophobic agent, a small amount of surfactant may be incorporated. The surfactant must also be chosen of a composition so that it can be removed without destroying the polymer. Commercially available liquid dispersed hydrophobic agents generally incorporate a surfactant that can be thermally decomposed and volatilized at the sintering temperature of the hydrophobic agent.

It is preferred to lay a loaded and compressed carrier formed according to my invention on a heated surface and to spray a liquid dispersion of the hydrophobic agent onto the upper surface of the carrier at a rate lower than the rate at which the liquid can enter the pores of the carrier. This insures that the hydrophobic agent enters the pores of the carrier and is not deposited merely as a surface coating. In order to prevent collection of the liquid dispersant in the pores of the carrier and possible puddling of the dispersant and hydrophobic agent adjacent the lower surface of the carrier, it is preferred that the hot surface supporting the carrier be maintained at a temperature above the boiling point of the liquid dispersant, but below the sintering temperature of the hydrophobic agent. For aqueous dispersions of linear fluorocarbon polymer hydrophobic agents I have found supporting surface temperatures in the range of from 650° through 450° F to be suitable. If desired, a pressure differential may be established across the carrier during spraying to improve penetration by the hydrophobic agent.

According to an alternate wet-proofing technique the loaded and compressed carrier is immersed in a liquid dispersed hydrophobic agent of the composition described above. In order to insure that the hydrophobic agent enters the pores of the carrier and is not held to surface contact with the carrier by gases occluded in the pores, a vacuum is preferred to be drawn adjacent the surface of the liquid dispersion while the carrier is immersed. This produces a relatively uniform wet-proofing of the carrier pore surfaces.

In accordance with conventional practice the carrier is first dried and then sintered after being impregnated with the liquid dispersed hydrophobic agent. This performs the two-fold function of removing the liquid dispersant and of driving off the surfactant, if any, used to allow the hydrophobic agent to be dispersed.

The steps of spraying and immersing are preferably employed in combination as indicated in FIG. 1. While performing these steps in the order shown has been found to yield optimum results, it is appreciated that use of one or the other of these steps alone is capable of yielding efficient electrode sturctures. Further, it is recognized that the order of performing these two wet-proofing steps may be reversed, if desired. It is preferred to perform one step through sintering before performing the remaining step. It is also anticipated that the steps may be repeated separately or in sequence as many times as desired to yield the desired degree of hydrophobicity. Finally, it is pointed out that either or both of these steps may be displaced by other conventional wet-proofing techniques or used in combination therewith.

The process schematically illustrated in FIG. 1 is intended merely to describe a preferred embodiment of my process. It is appreciated that a number of variations are possible. For example, step C of the illustrated process embodiment is to compress the carrier. In developing my process I have additionally performed the step of compressing prior to loading and also subsequent to wet-proofing. In each instance efficient electrode structures were obtained. It is recognized that another variation of my process would be to disperse the electrocatalyst particles within the fluid medium as it is being transported toward the catalyst. This could be accomplished, for example, by introducing the particles into the neck of a venturi upstream of the carrier. It is also anticipated that the step of wet-proofing could be totally or partially combined with the step of loading. This would involve merely the adding of a small amount of hydrophobic agent to the liquid dispersion containing the finely divided particles. Testing has shown this technique to be operative, but not preferred in view of some tendency for the particles when combined with the wet-proofing agent to agglomerate on the surface of the carrier. It is appreciated, of course, that in many cell applications where the operating temperature is well above the boiling point of water—e.g., in cells utilizing fused or molten electrolytes—wet-proofing may be entirely omitted with no performance penalty.

Fluid electrodes produced according to my process are unique in that they uniformly distribute both an electrocatalyst and a hydrophobic agent in intimate relationship throughout the pores of a carrier having average pore diameters less than one-tenth of the thickness of the carrier. No fluid electrode has been constructed prior to my invention which achieves such an intimate relationship of carrier, hydrophobic agent, and electrocatalyst. Conventional techniques which first intimately blend electrocatalyst particles and hydrophobic agent have achieved intimate penetration of only carriers having relatively large diameter, straight-through pores. Attempts to introduce electrocatalysts into narrow-pore carriers have not achieved any degree of uniformity. Further, attempts to wet-proof electrocatalyst loaded narrow-pore carriers have produced only selective wet-proofing of large pores rather than uniform wet-proofing of the narrow-pore carrier.

It is considered that the substitution of fluid electrodes formed according to my invention for conventional fluid electrodes is a matter well within the skill of the art. It is anticipated that my fluid electrodes may be efficiently utilized as either anodes or cathodes for the oxidation of conventional fluid fuels or the reduction of conventional fluid oxidants. My fluid electrodes may be used in combination with conventional aqueous electrolytes, including acid, alkaline, and saline electrolytes. When hydrophobic agents are omitted, my electrodes may be used with fused electrolytes. My fluid electrodes may be used in metal-oxidant cells, such as zinc-air, magnesium-air, and aluminum-air cells. My fluid electrodes may also be used in fuel cells when such cells are used to generate electrical energy or are supplied with electrical energy to achieve fluid electrolysis according to techniques well understood in the art. My fluid electrodes may be used in electrodialysis cells. Additionally, my fluid electrodes may be used as detection electrodes to sense or measure the concentration of fluid substances capable of electrochemical oxidation or reduction.

The following specific examples further illustrate my invention:

EXAMPLE 1

A porous nickel carrier was made by using an expanded and flattened nickel substrate commonly designated as 4/0 mesh. This substrate was provided with diamond shaped openings characteristic of expanded metal having a major axis of 77 mils and a minor axis of 38 mils. The metal strand width was 7 mils and the metal thickness 5 mils.

Water was thickened with 1 percent by weight sodium carboxymethylcellulose to provide a viscosity of 4,900 centipoise. Finely divided nickel powder was then mixed with the thickened water in a ratio of 1.17 g nickel per gram of water. The resulting slurry was uniformly applied to both faces of the substrate using doctor blades. The slurry was dried in place using infrared lamps and the substrate was then placed in a 1,000° C muffle furnace for 2 minutes in the presence of a reducing atmosphere to sinter the nickel particles to the substrate and produce the composite carrier. A 4 inch by 8 inch plaque was cut from the carrier. The plaque exhibited a thickness of 0.50 mm, a mean pore size of 12 microns, and a porosity of 81.3 percent. To assure full reduction the plague was heated to 500° C for 1/2 hour in a hydrogen atmosphere.

A precious metal catalyst comprised of 31 percent by weight palladium and 69 percent by weight platinum, each in the form of a black, was blended with water using a Waring blender at high speed. 1 liter of water was utilized together with 1.19 grams of precious metal, and blending was continued for a period of 5 minutes. The aqueous dispersion was then placed in a flask similar to flask 1 shown in FIG. 2. The 4 inch by 8 inch plaque was mounted as illustrated in FIG. 2, and a vacuum pump was attached to the upper side arm of the flask to reduce the pressure within the flask to 25 inches of mercury absolute. A peristaltic pump was attached to the lower side arm of the flask, and the discharge from the pump was uniformly distributed over the surface of the plaque by moving the hose forming the discharge source. Circulation of the aqueous dispersion was continued until it was visually observed to become very nearly colorless. In this way a precious metal loading of 2.5 mg/cm$^2$ of plaque surface was obtained while 0.2 mg/cm$^2$ of plaque surface was the precious metal content of the liquid at the end of circulation.

The loaded plaque was removed from the apparatus constructed according to FIG. 2 and dried at 110° C for 30 minutes in air. The loaded plaque was then compressed 38 percent at room temperature. This reduced the plaque thickness to 0.31 mm, a mean pore size of 5 microns, and reduced the porosity to 68.4 percent.

The loaded and compressed plaque was then vacuum impregnated with polytetrafluoroethylene (PTFE). A dispersion of 3.8 percent by weight Teflon-30 in water was prepared. Teflon-30 is a trademarked designation for an aqueous dispersion of PTFE and water comprised of 60 percent by weight solids. Wetting agents are, of course, included in the Teflon-30 to allow th hydrophobic PTFE to be dispersed in water. The plaque was immersed in the aqueous dispersion and the pressure over the aqueous dispersion was reduced until vigorous bubbling of the dispersion was noted. Upon removal from the dispersion the plaque was dried as described above and then cured in air for 10 minutes at 340° C. The heat treatment removed the wetting agent from the dispersion.

One surface of the plaque was then sprayed with the dispersion containing 3.8 percent by weight Teflon-30 noted above. The plaque was heated to 450° F for 1½ minutes before spraying with an air brush. Impregnation by immersion provided a PTFE loading of 0.91 mg/cm$^2$ while spraying produced a loading of 2.29 mg/cm$^2$ of PTFE for a total loading of 3.2 mg/cm$^2$ PTFE. Formation of the fluid electrode was completed by curing for 10 minutes at 340° C in air.

To test the operating characteristics of the fluid electrode so formed, the electrode was edge masked to leave an exposed active area of 181 cm$^2$. The electrode was mounted to form a part of an electrolyte container so that one face (the face sprayed with PTFE) was in contact with air while the remaining face was in contact with a 7 percent by weight percent sodium chloride electrolyte solution. A magnesium anode was immersed in the electrolyte and spaced from the inner surface of the fluid electrode 0.094 inch. The magnesium anode was of planar configuration and mounted parallel to the fluid electrode.

The cell so formed was subjected to a testing regimen of 12 hours duration during each of 24 days. The test was conducted in an oven at a temperature of 105° F. A current density of 4 amps/ft$^2$ was drawn for 9 minutes followed by a current density of 40 amps/ft$^2$ for a period of 1 minute, this cycling regimen being continuously repeated throughout the 12 hour testing period. At the start of testing the cell exhibited a voltage of 1.14 volts at 40 amps/ft$^2$ and 1.09 volts at the same current density at the end of the test 24 days later. This showed the fluid electrode to be well suited for use as an air cathode. Since performance of a fluid electrode as an air cathode is a far more rigorous test of electrode capability than the performance of the fluid electrode as a hydrogen anode, it follows that the electrode was suitable for use as a hydrogen anode.

EXAMPLE 2

The procedure of Example 1 was repeated, except that compression of the plaque was performed immediately after its formation and immediately prior to heat treatment in a hydrogen atmosphere at 500° C for 1/2 hour. The same testing regimen was utilized, except that tests were terminated at the end of 14 days rather than 24 days. At the start of testing the cell exhibited a potential of 1.1 volts at 40 amps/ft$^2$ while at the end of 14 days the potential was 1.0 volt at the same current density. This example illustrates the feasibility of compression prior to loading the plaque or carrier; however, by comparing test results it is apparent that an advantage is gained by compression after loading.

EXAMPLE 3

To illustrate the effect of wet-proofing entirely by spraying rather than immersing the plaque in PTFE dispersion and drawing a partial vacuum, a plaque was formed according to Example 1, except that a precious metal loading of 2.54 mg/cm$^2$ was obtained, the step of immersing in PTFE dispersion was omitted, and the step of spraying was performed twice in succession with intermediate drying and curing. At 40 amps/ft$^2$ a potential of 1.09 volts was obtained in a cell constructed as described in Example 1.

EXAMPLE 4

A fluid electrode was built and tested according to Example 1, but with the following variations: Nickel powder was added to a water and sodium carboxymethyl cellulose sol having a viscosity of 3,100 cps in a proportion 0.740 g/g of water. The carrier which was formed exhibited a thickness 0.45 mm and a porosity of 87.2 percent. The carrier thickness was initially in excess of 40 X the mean pore diameter. The step of compressing the plaque was entirely omitted. The fluid electrode was masked to have an exposed active surface area of 10 cm$^2$ and was spaced 0.25 inch from the magnesium anode. Under the same testing regimen as in Example 1 the cell exhibited a potential of 1.11 volts at 40 amps/ft$^2$ initially and a potential of 1.1 volts at the same current density 10 days later. This illustrated that compression is not an essential step in my procedure of electrode formation.

While my fluid electrodes and my process for their manufacture have been disclosed and exemplified with reference to certain preferred embodiments, it is appreciated that numerous variations will readily occur to those skilled in the art once apprized of my teaching. It is accordingly intended that the scope of my invention be determined with reference to the following claims.

What I claim and desire to secure by Letters Patent of the United States is:

1. A process of manufacturing a fine pore fluid electrode structure exhibiting both uniform hydrophobic properties and minimal internal resistance comprising:
   a. dispersing a finely divided electrocatalytically active material having a mean diameter of less than about 0.1 microns in a fluid medium;
   b. *I* forming a porous sintered nickel substrate having a pore size of from 1–15 microns, a thickness of from at least 40 times the mean pore size and a porosity of from 25–90 percent, said pores extending from one major face of said substrate to the opposite face;
   c. mounting said substrate in a funnel having upper and lower clamping gaskets fitted therein to engage the periphery of both major faces of said substrate to prevent fluid placed in said funnel from diverting around said substrate, said funnel having fluid retaining means above said substrate and gaskets, and central corrugated support means beneath said substrate, and being further provided with vacuum means to provide a pressure drop across said substrate;
   d. depositing the electrocatalytically active material in the pores of said substrate by:
      1. reducing the pressure adjacent the lower major face of said substrate with respect to the pressure adjacent the upper major face;
      2. delivering said fluid medium with the active material dispersed to said upper major face of said substrate in said funnel at a rate less than the rate of transport through the substrate to inhibit surface deposition of said active material;
      3. collecting the fluid medium after it passes through said substrate and recirculating it through said substrate in the same direction until a catalyst loading of about 2.5 mg/cm$^2$ of substrate surface is achieved;
   e. impregnating the substrate with a liquid dispersion of a linear halocarbon hydrophobic agent having a critical surface tension less than 32 dynes/cm; and
   f. heating the substrate to (1) drive off the liquid dispersant; and (2) sinter the linear halocarbon.

2. The process of claim 1 including drawing a portion of the ambient atmosphere through the substrate along with the fluid medium during deposition of the electrochemically active material in the pores of the substrate.

3. The process of claim 1 including the step of impregnating the substrate with hydrophobic agent by spraying the liquid dispersant onto the substrate at a rate below the maximum rate at which the fluid medium can enter the pores of the substrate and simultaneously heating the substrate so that the fluid medium is evaporated as it penetrates the substrate.

4. The process of claim 1 including repeating the steps of impregnating with hydrophobic agent and heating the substrate after the first heating step.

5. The process of claim 1 including the step of compacting the substrate prior to impregnation with the hydrophobic agent.

6. The process of claim 5 in which said compacting step follows deposition of the electrochemically active material in the pores so that the active material is locked within the pores.

7. The process of claim 1 including the step of impregnating the substrate with hydrophobic agent by immersing the substrate in an aqueous suspension of hydrophobic agent.

8. The process of claim 7 including reducing the pressure ambient to the aqueous suspension of hydrophobic agent while the substrate is immersed therein.

* * * * *

UNITED STATES PATENT OFFICE
CERTIFICATE OF CORRECTION

Patent No. 3,769,093          Dated    October 30, 1973

Inventor(s)   Paul W. Jones

It is certified that error appears in the above-identified patent and that said Letters Patent are hereby corrected as shown below:

In the Claims:

Claim 1, line 7, cancel "1" (first occurrence);

line 9, cancel "from".

Signed and sealed this 23rd day of April 1974.

(SEAL)
Attest:

EDWARD M. FLETCHER, JR.          C. MARSHALL DANN
Attesting Officer                Commissioner of Patents